United States Patent
Hochmuth et al.

(10) Patent No.: US 7,941,508 B2
(45) Date of Patent: May 10, 2011

(54) ASSOCIATING MULTIPLE DEVICES WITH REMOTE COMPUTERS

(75) Inventors: Roland M. Hochmuth, Fort Collins, CO (US); James M. King, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 526 days.

(21) Appl. No.: 11/537,408

(22) Filed: Sep. 29, 2006

(65) Prior Publication Data

US 2008/0082639 A1    Apr. 3, 2008

(51) Int. Cl.
G06F 15/16    (2006.01)
(52) U.S. Cl. ..................................... 709/220; 709/229
(58) Field of Classification Search .................. 709/220, 709/227, 200–203, 217–219, 228–229
See application file for complete search history.

(56) References Cited

U.S. PATENT DOCUMENTS

| | | | |
|---|---|---|---|
| 6,067,407 A * | 5/2000 | Wadsworth et al. | 709/224 |
| 7,075,670 B1 * | 7/2006 | Koga | 358/1.15 |
| 7,197,465 B1 * | 3/2007 | Hu et al. | 705/1 |
| 2002/0131079 A1 * | 9/2002 | Forbes et al. | 358/1.15 |
| 2006/0075106 A1 * | 4/2006 | Hochmuth et al. | 709/227 |
| 2006/0202964 A1 * | 9/2006 | Liaw et al. | 345/168 |
| 2007/0016714 A1 * | 1/2007 | Huotari et al. | 710/313 |
| 2007/0079008 A1 * | 4/2007 | Leibovich et al. | 709/246 |
| 2007/0124685 A1 * | 5/2007 | Guillermo et al. | 715/740 |

* cited by examiner

*Primary Examiner* — Moustafa M Meky

(57) ABSTRACT

A method comprises determining whether settings associated with a plurality of devices coupled to a client computer are provided in the client computer. The client computer is adapted to be coupled to a plurality of remote computer. If the settings are provided in the client computer, the method further comprises determining to which of the remote computers each device is to be associated, and operatively associating each device to the particular remote computer to which that device is determined to be associated. As a result, multiple devices can be concurrently associated with remote computers.

18 Claims, 2 Drawing Sheets

ASSOCIATING MULTIPLE DEVICES WITH REMOTE COMPUTERS

BACKGROUND

Peripherally connected devices, such as Universal Serial Bus (USB) devices, are accessed by the computer to which they are directly connected. In some situations, however, it is desirable to access, from a remote computer, a device operatively coupled to a client computer. A client computer, to which one or more peripheral devices can be connected, may be able to establish communication sessions with multiple remote computers.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct, electrical, optical or wireless connection. Thus, if a first device couples to a second device, that connection may be through one or more intermediary devices

DETAILED DESCRIPTION

Figure 1:
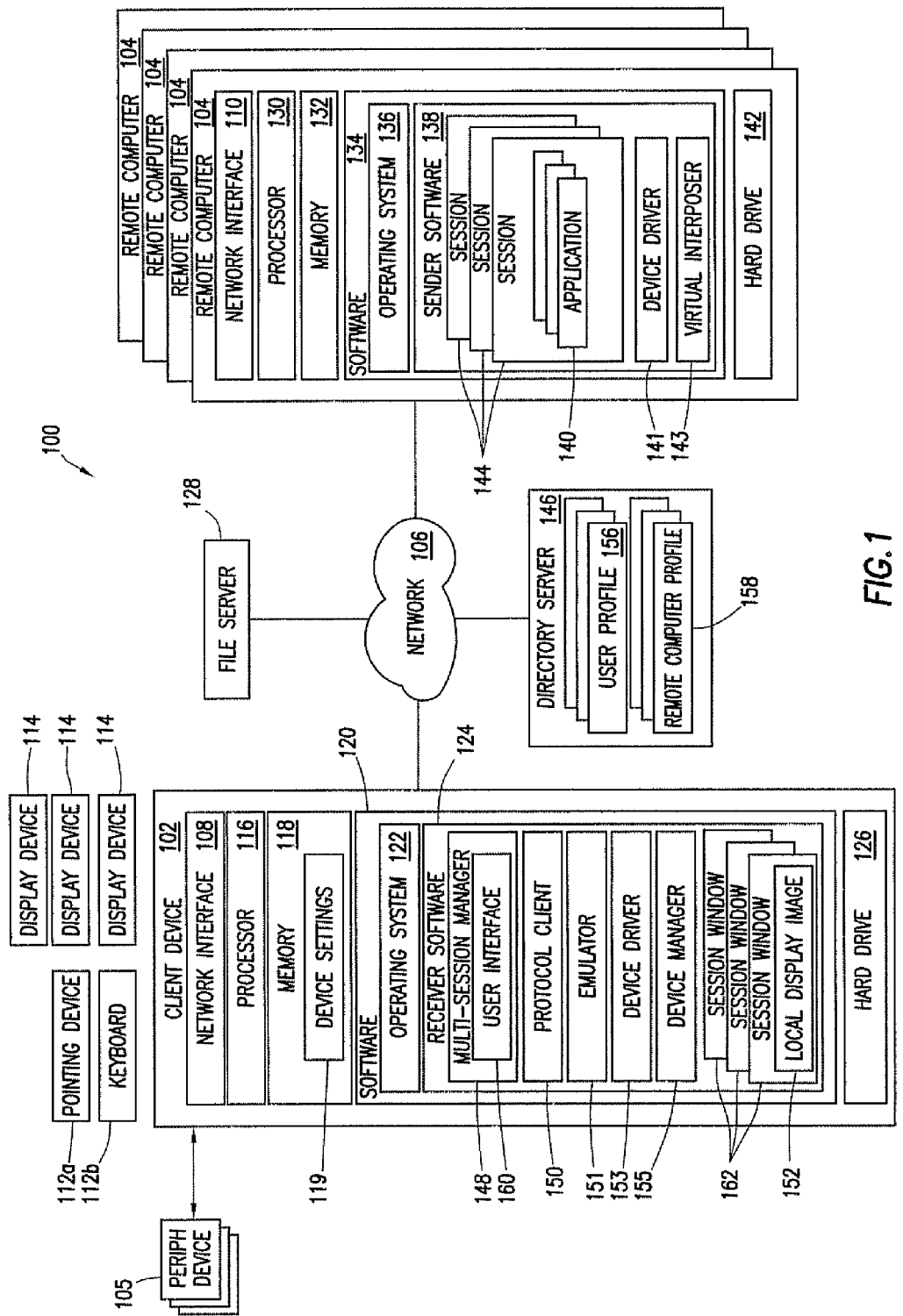
FIG. 1 is a block diagram of a computing system in accordance with embodiments.

FIG. 1 is a block diagram of one embodiment of a computing system 100. In the embodiment shown in FIG. 1, the system 100 comprises a client device 102 and multiple remote computers 104. A network 106 communicatively couples the client device 102 and the remote computers 104 to one another. In one embodiment, the network 106 comprises a local area network (LAN). In some embodiments, the LAN comprises a wired LAN supporting, for example, an ETHERNET networking protocol. In other embodiments, the LAN comprises a wireless LAN supporting, for example, one of the Institute for Electrical and Electronics Engineers (IEEE) 802.11 family of wireless networking standards. In other embodiments, the network 106 comprises, in addition to or instead of a wired LAN and/or a wireless LAN, other types of networks such as a wide area network (e.g. the Internet) and/or a virtual private network (VPN).

The client device 102 comprises a network interface 108 and each of the remote computers 104 includes a network interface 110. Each of the network interfaces 108 and 110 comprises appropriate networking interface components (for example, network interface cards, wireless transceivers, and/or modems) for communicatively coupling the client device 102 and the remote computers 104, respectively, to the network 106. For example, in one embodiment in which the network 106 is implemented as a wired LAN supporting an ETHERNET networking protocol, each of the network interfaces 108 and 110 are implemented using ETHERNET network interface cards.

One or more input devices 112 for receiving input from a user of the client device 102 are communicatively coupled to the client device 102. In the embodiment shown in FIG. 1, the input devices 112 comprise a keyboard (112b) and a pointing device (112a) such as a mouse or trackball. At least one display device 114 (such as a computer monitor) is communicatively coupled to the client device 102. In the embodiment shown in FIG. 1, three display devices 114 are coupled to the client device 102. In other embodiments, other numbers of input device 122 and/or display devices 114 are coupled to the client device 102.

The client device 102 also comprises at least one programmable processor 116 and memory 118 in which software 120 executed by the programmable processor 116 and related data structures are stored during execution. Memory 118 comprises any suitable memory now known or later developed such as, for example, random access memory (RAM) and/or registers within the processor 116. The software 120 executing on the processor 116 performs at least some of the processing described herein as being performed by the client device 102. In the embodiment shown in FIG. 1, the software 120 executed by the processor 116 comprises an operating system 122 and receiver remote computing software 124 (also referred to here as the "receiver software" 124).

The software 120 executed by the processor 116 of the client device 102 comprises appropriate program instructions that implement the functionality to be performed by the software 120. The program instructions for such software 120 are stored on or in a computer-readable medium. The computer-readable medium comprises volatile storage, non-volatile storage, or combinations thereof. As volatile storage, the computer-readable medium may comprise random access memory (RAM)>As non-volatile storage, the computer readable medium may comprise a hard drive, a compact disk read-only memory (CD ROM), a tape drive, read only memory (ROM), Flash memory, etc. In the example shown in FIG. 1, the computer-readable medium comprises a local hard drive 126. During operation, the processor 116 reads the program instructions from the hard disk 126, stores the instructions in memory 118, and executes the program instructions from memory 118.

In some embodiments, the computer-readable media on which software 120 is stored is not local to the client device 102. For example in one such embodiment, at least a portion of the software that is executed on the client device 102 is stored on a file server 128 that is coupled to the client device 102 over, for example, the network 106. In such an embodiment, the client device 102 retrieves such software from the file server 128 over the network 106 in order to execute the software. In other embodiments, some or all of the software 120 is delivered to the client device 102 for execution thereon in other ways. For example, in one such other embodiment, such software is implemented as a servelet (for example, in the JAVA programming language) that is downloaded from a hypertext transfer protocol (HTTP) server and executed by the client device 102 using an Internet browser running on the client device 102.

The various components of the client device 102 are communicatively coupled to one another as needed using appropriate interfaces, for example, buses, ports, software interfaces, etc. In one implementation of the client device 102 shown in FIG. 1, the client device 102 is implemented as a "thin client" that is designed primarily to use and interact with software executing on the remote computers 104. In another implementation, the client device 102 is implemented as a "thick client" using a personal computer or workstation that is capable of running various types of software locally in addition to using and interacting with software executing on the remote computers 104.

Each remote computer 104 comprises at least one programmable processor 130 and memory 132 in which software 134 executed by the programmable processor 130 and related data structures are stored during execution. Memory 132 comprises any suitable memory now known or later developed such as, for example, RAM and/or registers within the processor 130. Software 134 executing on the processor 130 of each remote computer 104 performs at least some of the processing described herein as being performed by that remote computer 104. In the embodiment shown in FIG. 1, the software 134 executed by the processor 130 of each remote computer 104 comprises an operating system 136, sender remote computing software 138 (also referred to here as "sender software" 138), application software 140, a device driver 141, and a virtual interposer 143.

The software 134 executed by each processor 130 comprises appropriate program instructions that implement the functionality to be performed by the software 134. The program instructions for such software 134 are stored on or in a computer-readable medium which comprises volatile storage, non-volatile storage, and combinations thereof as explained previously with regard to the client device 102. In the embodiment shown in FIG. 1, the computer-readable medium comprises a local hard drive 142 in each remote computer 104. During operation, the processor 130 of each remote computer 104 reads the program instructions from the hard disk 142, copies the instructions to memory 132, and executes the program instructions from memory 132.

In some embodiments, the computer-readable media on which the software 134 is stored is not local to its respective remote computer 104. For example, in one such embodiment, at least a portion of the software that is executed on each remote computer 104 is stored on the file server 128 that is coupled to that remote computer 104 over, for example, the network 106.

The various components of each remote computer 104 are communicatively coupled to one another as needed using appropriate interfaces, for example, buses, ports, software interfaces, etc. In accordance with at least some embodiments, each remote computer 104 is packaged in a blade configuration suitable for mounting in a rack.

In the embodiment shown in FIG. 1, the system 100 also comprises a directory server 146 in which various information related to the system 100 is stored. For example, in one implementation, the information stored in the directory server 146 comprises a profile 156 (also referred to here as a "user profile" 156) for each user that has access to the remote computers 104 and a profile 158 (also referred to here as a "remote computer profile" 158) for each remote computer 104 included in the system 100. In such an implementation, each user profile 156 specifies on which remote computers 104 the user is authorized to establish a session 144. In one implementation, the directory server 146 is implemented using a Lightweight Directory Access Protocol (LDAP) server. In other implementations, the directory server 146 is implemented in other ways. The client device 102 and the remote computers 104 are communicatively coupled to the directory server 146, for example, using the network 106.

In the embodiment shown in FIG. 1, the receiver software 124 comprises a multiple-session manager 148 (also referred to as the "session manager" or "session manager application" 148). The multiple-session manager 148 enable the client device 102 to be operatively and concurrently coupled to multiple remote computers. The multiple-session manager 148 comprises a user interface 160 for a user of the client device 102 to configure, open, monitor and otherwise control a set of sessions 144 on one or more of the remote computers 104. The multiple-session manager 148 receives input from and displays output for the user of the client device 102 via the user interface 160. In one embodiment, the user interface 160 comprises a graphical user interface that includes one or more visual controls with which a user interacts (e.g. using a pointing device such as mouse) to provide input to the multiple-session manager 148 and in which the multiple-session manager 148 displays output for the user. In another embodiment, the user interface 160 of the multiple-session manager 148 comprises a command-line interface that provides a command prompt at which the user types commands to be carried out by the multiple-session manager 148 and at which the multiple-session manager 148 prints information for the user. In another embodiment, the user interface 160 comprises both a graphical user interface and a command-line interface. In other embodiments, the user interface 160 of the multiple-session manager 148 is implemented in other ways.

The receiver software 124 also comprises one or more remote computing protocol clients 150. Each remote computing protocol client 150 (also referred to herein as a "protocol client" 150) implements the functionality required for the receiver software 124 to interact with one or more sessions 144 on the remote computers 104 using a particular remote computing protocol. One example of a remote computing protocol is an image-based remote computing protocol. Other examples of remote computing protocols include the MICROSOFT Remote Desktop Protocol (RDP) protocol and the CITRIX Independent Computing Architecture (ICA) protocol. In the particular embodiment shown in FIG. 1, the receiver software 124 comprises one remote computing protocol client 150. In other embodiments, other numbers or types of remote computing protocol clients 150 are used.

For each session 144 with which a protocol client 150 communicates, the protocol client 150 receives user input intended for that session 144 from one or more of the input devices 112 coupled to the client device 102 and sends the received user input to the session 144 over the network 106. Also, for each session 144 with which a protocol client 150 communicates, the protocol client 150 receives display information generated for that session 144 by the sender software 138 that executes that session 144. The protocol client 150 displays a window 162 (also referred to here as a "session window" 162) for that session 144 on one or more of the display devices 114 coupled to the client device 102 and renders a local display image 152 within the session window 162 using the display information received from the sender software 138 for that session 144.

In one implementation, each session window 162 comprises appropriate user interface elements that enable the user to perform various operations on the session window 162 and the associated session 144, such as moving, resizing, minimizing, scrolling, and closing the session window 162 (and the local display image 152 displayed therein) and terminating or suspending the session 144 associated with that session window 162.

In one implementation of a remote computing protocol, the display information for a session 144, for example, comprises graphics primitives that specify particular graphical operations that are to be performed in order to generate the local display image 152 for that session 144. In such an implementation, the protocol client 150 renders the local display image 152 in the respective session window 162 by performing the graphical operations specified by the received graphics primitives. In another implementation of a remote computing protocol (also referred to herein as an "image-based remote computing protocol"), the sender software 138 generates a remote display image for each session 144. In such an implementation, the display information for a session 144 comprises raster data from the remote display image generated for that session 144. The protocol client 150 renders the local display image 152 by displaying the raster data generated for that session 144 in that session's session window 162.

The sender software 138 executing on each remote computer 104 implements the functionality required for the sender software 138 to interact with the receiver software 124 executing on the client device 102 using a particular remote computing protocol. For example, the sender software 138 opens one or more sessions 144 on the remote computer 104 on which the sender software 138 executes, executes one or more applications 140 within the session 144, receives user input from the protocol client 150 executing on the client device 102, and either processes the received user input or directs the received user input to an application 140 executing within the session 144. The sender software 138 executing on each remote computer 104 also generates display information for each open session 144 and sends the generated display information to the protocol client 150 of the client device 102. In the embodiment shown in FIG. 1, the sender software 138 executing on each remote computer 104 supports a remote computing protocol that is the same as, or compatible with, the remote computing protocol supported by the protocol client 150 on the client device 102.

Referring still to FIG. 1, in accordance with embodiments of the invention, one or more peripheral devices 105 can be coupled (e.g. directly connected) to the client device 102, but associated with one of the remote computers 104. The "association" of the peripheral device 105 to a remote computer 104 enables the remote computer 104 (or an application 140 running on the remote computer 104) to attempt to interact with the peripheral device 105 as if the peripheral device was connected directly to the remote computer-instead, the peripheral device is connected to the client device 102. As such, an application 140 that interacts with a peripheral device 105 can be used without modification even though the peripheral device is connected to a different computer (the client device 102). As explained above, the client device 102 can establish one or more concurrent sessions with multiple remote computers. In accordance with embodiments of the invention, the peripheral devices 105 can be associated concurrently with the various remote computers. That is, one peripheral device may be associated with one remote computer while another remote device is associated with another remote computer.

In some embodiments, each peripheral device 105 comprises a Universal Serial Bus (USB) compatible device such as a Personal Digital Assistant (PDA) or a keyboard or pointing device (e.g., keyboard or pointing device 112). In other embodiments, a peripheral device 105 can be other than a USB device. The peripheral devices 105 may also comprise printers, scanners, printer/scanner combinations, etc.

The receiver software 124 of the client device 102 comprises, or has access to, an emulator 151, a device driver 153 and a device manager 155. The device manager 155 detects when each of the peripheral devices is coupled to the client device 102 and determines, for each such device, the particular remote computer for which each such peripheral device is to be operatively associated. Multiple peripheral devices 105 can be coupled concurrently to the client device 102 with one or more peripheral devices being concurrently associated with a different remote computer 104 than one or more other peripheral devices.

The following discussion explains how a particular peripheral device 105 interacts with a particular remote computer 104. The device driver 141 on the remote computer 104 receives "calls" from an application 140 (e.g., a device user application) and responds by issuing calls intended for one or more lower level drivers 141 (which may or may not be present on remote computer 104). A "call" may operate to cause the device driver associated with the peripheral device to perform a desired action such as providing data to the remote computer 104. The virtual interposer 143 intercepts such calls intended for the lower level drivers, forms one or more packets containing the calls, or at least information associated with the intercepted calls, and provides such packets to the sender software 138. The purpose of the virtual interposer 143 is to intercept calls from the device driver 141 intended for the device 105, and not allow such calls to proceed to a lower level driver in the operating system 136. The virtual interposer 143 converts the intercepted call into a packet of data suitable for transmission over the network 106. The packet formed by virtual interposer 143 comprises the call, or at least information associated with the intercepted call, as a data payload associated with the packet. The sender software 136 sends the packet across network 106 to the receiver software 124 in the client 102.

The receiver software 124 receives the packet and extracts the protocol call, or call-related information, from the received packet and provides the extracted call to the emulator 151. In some such software embodiments of the emulator 151, a portion of the emulator is implemented in the client device's "user space" and another portion of the emulator is implemented in "kernel space." The emulator 151 emulates the protocol (e.g., USB protocol) associated with the peripheral device 105. Once the relevant protocol is emulated on client device 102, the emulator 151 provides a native call to a device driver 153 which, in turn, accesses the associated peripheral device 105.

Figure 2:
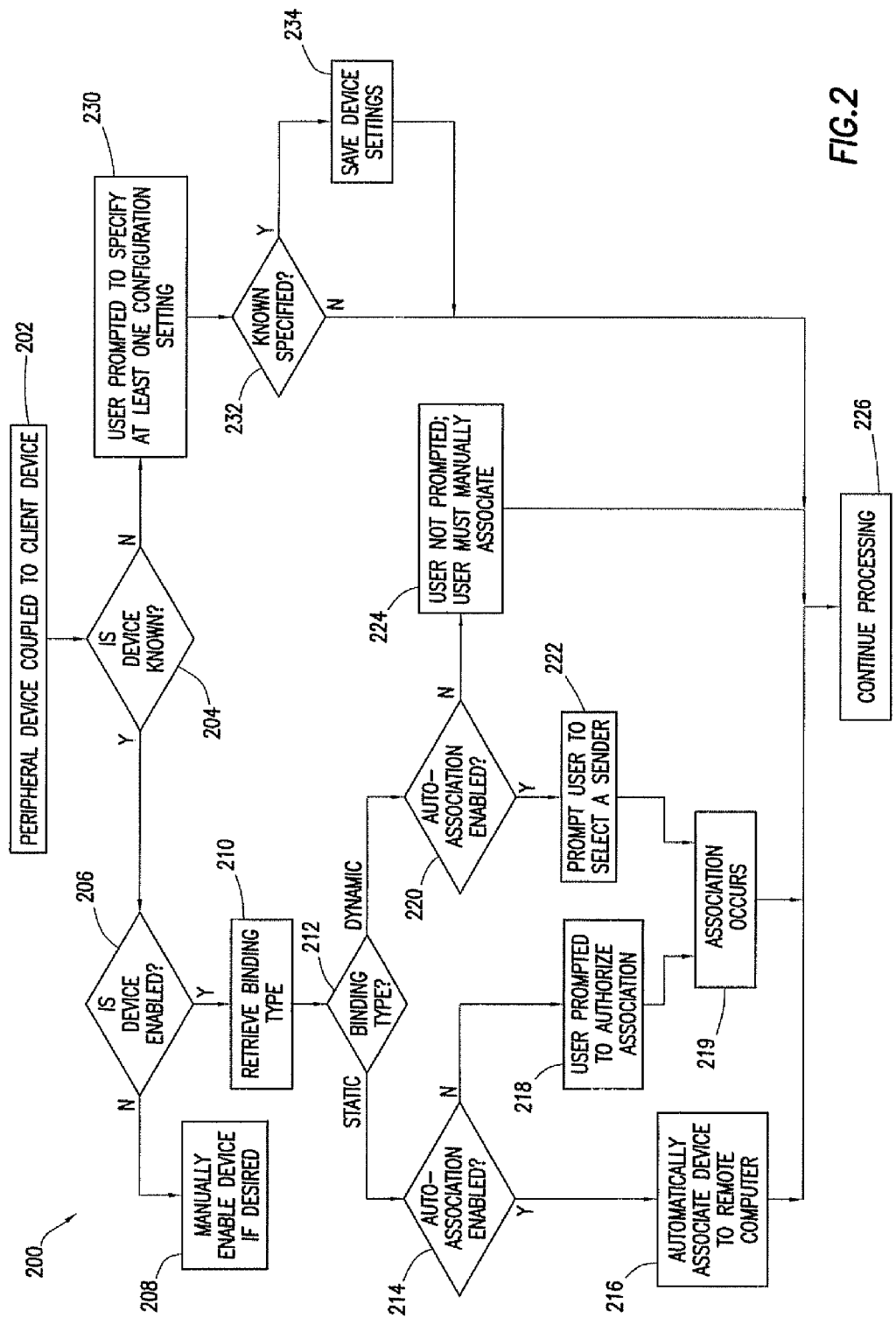
FIG. 2 is a flow diagram of a method of associating peripheral devices with remote computers in accordance with embodiments

Referring now to FIG. 2, an embodiment of a method 200 is illustrated by which the multiple peripheral devices 105 can be associated concurrently with multiple remote computers 104 and/or multiple sessions 144. Method 200 is performed upon each peripheral device being coupled to client device 102. The device manager 155 performs some or all of the actions depicted in FIG. 2. At 202, a user couples a peripheral device 105 to the client device 102 and the connection is detected by the device manager 155. At 204, a determination is made as to whether the newly coupled device 105 is a "known" device. A known device is one in which settings 119 (FIG. 1) associated with that device are stored in the client device (e.g., in memory 118). The device settings 119 for given peripheral device 105 comprise any or all of the following:

Status: the status can be enabled/disabled or connected/unconnected indicating, respectively, whether the device is currently enabled or disabled or connected or unconnected. For example, a device can be connected but disabled.

Binding type: static or dynamic.

A remote computer's identity to be associated with the peripheral device.

Auto-association: indicates whether the peripheral device is to be automatically associated with a particular remote computer (i.e., without requiring user authorization).

Name: an identifying value (e.g., alphanumeric name) for peripheral device.

The binding type indicates how the peripheral device is to be associated with a remote computer 104. Static binding means that, for the peripheral device, a remote computer 104 has been pre-designated for which the peripheral device is to be associated. Dynamic binding means that a remote computer 104 is selected during run-time for association with the peripheral device 105. For example, a user can be prompted to select a remote computer 104 with which to be associated with a particular peripheral device 105. If the binding type is "static," the identity of the pre-designated remote computer is also provided as part of the peripheral device's settings 119. The auto-association feature may or may not be activated. If auto-association is activated, then the peripheral device 105 is automatically associated with the remote computer; otherwise, the user is prompted to authorize the association to occur (e.g., by clicking an "OK" or "CONTINUE" button on a display 114). For convenience to the user, each peripheral device 105 can be given a user-friendly, readable name which is shown on display 114 when a user selects a device 105 for any reason (e.g., to configure a device or select a device for association with a remote computer 104).

Referring still to FIG. 2, if the newly coupled device 105 is known (204), the device manager 155 determines at 206 whether the device 105 is enabled or disabled (e.g., by reading the device's device settings 119). If the device 105 is currently disabled, the user at 208 can manually enable the device if desired. Manually enabling the device 105 can be performed, for example, by changing the status of the device to "enable." If the device is currently enabled, then the device manager 155 retrieves the binding type at 210 from the device settings 119 for that device.

At 212, the device manager 155 determines whether the binding type is static or dynamic. If the binding type is static, then at 214 the device manager 155 determines whether auto-association has been configured for the device 105. If auto-association has been configured for the device, then at 216, the device 105 is automatically associated with the remote computer pre-designated for that device, preferably without further authorization. If, however, auto-association has not been configured for the device as determined at 214, then at 218, the user is prompted to authorize the association, and the association occurs at 219. An "OK" or "CONTINUE" button (or equivalent) can be shown on display 114 that the user clicks to authorize the association. Otherwise, without the user authorization, the association will not occur, or an association could occur but on a limited basis (e.g., with less functionality, access by the user to fewer resources, no access to sensitive data or resources, etc.).

If, at 212, the binding type is determined to be "dynamic," the device manager 155 determines whether auto-association has been configured for the device 105. If auto-association has been configured for the device, then at 222, the user is prompted to select a remote computer for the association and the association occurs at 219. The user may be presented with a list of available remote computers 104 on display 112, and the user selects one of the available remote computers. If, however, auto-association has not been configured for the device as determined at 220, then at 224, the user is not prompted to select a remote computer and an association does not occur.

If the device is not known (204), control passes to 230 at which the user is prompted to provide at least one configuration setting for the newly attached peripheral device 105. For example, the use may be prompted to specify whether the device is to be enable or disabled, the binding type, the identity of the remote computer 104 (in the case of static binding), whether or not auto-association is to performed, and the name of the peripheral device 105. The user can also specify whether the newly connected device is to be considered "known." Specifying "known" causes the newly entered settings (230) to be saved for use the next time the peripheral device is connected to the client device 102. At 232, the device manager 155 determines whether the user has specified "known." If known is specified, the newly entered device settings 119 are saved in the client device 102 (234). If "known" is not specified, the settings are not saved, thereby causing the user to again enter the settings the next time the same device 105 is connected to the client device 102. An association with the device occurs at 236.

Following actions 216, 219, 224, 232 (if known is not specified), and 234, control passes to block 226 in which processing continues. The continued processing may include the use of the newly connected peripheral device 105 and/or may include various other types of actions performed by the client device 102 and remote computers 104.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
   determining whether settings associated with a plurality of devices coupled to a client computer are provided in said client computer, said devices being coupled to the same client computer, said client computer adapted to be coupled to a plurality of remote computers;
   if said settings are provided in said client computer, determining to which of the remote computers each device is to be associated, and operatively associating each device to the particular remote computer to which that device is determined to be associated, thereby having multiple devices concurrently associated with remote computers;
   determining whether a remote computer has been pre-designated for which a device is to be associated; and
   as a result of determining that a remote computer has been pre-designated for association with said device, prompting the user to authorize the association.

2. The method of claim 1 further comprising prompting a user to specify settings for each device if settings are not otherwise provided in said client computer for that device.

3. The method of claim 2 prompting the user to specify whether to save said specified settings.

4. The method of claim 1 further comprising prompting a user to select a remote computer to be associated with a particular device.

5. The method of claim 1 further comprising determining, for a particular device, whether that device is to be associated with a particular remote computer without user intervention.

6. The method of claim 1 wherein, as a result of determining that a remote computer has not been pre-designated for association with the device, prompting a user to select a remote computer to be associated with the device.

7. The method of claim 1 wherein, as a result of determining that a remote computer has been pre-designated for association with the device,
   determining whether the device is to be associated with the remote computer without user intervention; and
   upon determining that the device is to be associated with the remote computer with user intervention, prompting the user to authorize the association.

8. The method of claim 7 further comprising, upon determining that the device is to be associated with the remote computer without user intervention, automatically associating the device with the remote computer.

9. A system, comprising:
   a processor; and
   a device manager executable on said processor, said device manager detects each of a plurality of devices being coupled to said system and separately determines, for each such device and, if present, based on settings previously stored in said system, the particular remote computer from among a plurality of remote computers that such device is to be operatively associated;
   wherein the device manager determines, for a given device, whether a remote computer has been pre-designated for which the given device is to be associated and, as a result of determining that a remote computer has not been pre-designated for association with the given device, prompting the user to select a remote computer to associate with the given device.

10. The system of claim 9 wherein said device comprises a universal serial bus (USB) device.

11. The system of claim 9 wherein said settings for a given device comprise at least one setting selected from a group consisting of status, whether the given device is to be statically associated with a particular remote computer or whether a user is to be prompted to cause the given device to be associated with the remote computer, an identity of a remote computer to be associated with the given device, whether the given device is to be automatically associated with a remote computer, and an identity of the given device.

12. The system of claim 9 wherein said device manager prompts a user to specify device settings for a given device if settings for the given device are not otherwise stored in said system.

13. The system of claim 9 wherein said device manager causes a given device to be operatively associated with the particular remote computer.

14. The system of claim 9 wherein, upon a given device being coupled to said system, said device manager associates the given device with the particular remote computer without a prompt from a user.

15. The system of claim 9 wherein, upon a given device being coupled to said system, said device manager prompts a user to authorize the given device to be associated with the particular remote computer.

16. The system of claim 9, wherein the device manager determines whether auto-association for the given device has been enabled after determining that a remote computer has not been pre-designated for association with the given device and before prompting the user to select a remote computer.

17. A computer-readable medium containing software that, when executed by a processor in a client computer, causes the processor to:
   detect that each of a plurality of devices are coupled to the client computer, said client computer adapted to be coupled to a plurality of remote computers;
   determine whether settings associated with each device are provided in said client computer; and
   if said settings are provided in said client computer for a given device, using said settings to determine to which of the remote computers said device is to be associated and operatively associate the device to the particular remote computer to which the device is determined to be associated;
   wherein at least one setting has at least two states, a first state that specifies that the given device is to be statically associated with a pre-designated remote computer and a second state that specifies that a user is to be prompted to select a remote computer to be associated with the given device.

18. The computer-readable medium of claim 17 wherein, for a given device, said software also causes the processor to determine whether the given device is to be automatically associated with the particular remote computer.

* * * * *